United States Patent [19]

Perälä et al.

[11] Patent Number: 5,021,637

[45] Date of Patent: Jun. 4, 1991

[54] METHOD OF CONTROLLING THE SUPPLY OF ELECTRIC POWER TO AN ELECTRIC SAUNA HEATER

[75] Inventors: Reijo Perälä, Hangonkylä; Antii Kivimaa, Kauniainen, both of Finland

[73] Assignee: Oy Helo-Tehtaat Helo-Factories Ltd., Hanko, Finland

[21] Appl. No.: 499,903

[22] Filed: Mar. 27, 1990

[30] Foreign Application Priority Data

Apr. 3, 1989 [FI] Finland ................................. 891586

[51] Int. Cl.$^5$ .................................................. H05B 1/02
[52] U.S. Cl. ...................................... 219/485; 219/483; 392/342; 392/394
[58] Field of Search ............................. 219/271–276, 219/362, 364–365, 483, 485, 378; 392/342, 394, 403

[56] References Cited

U.S. PATENT DOCUMENTS

| | | | |
|---|---|---|---|
| 3,532,857 | 10/1979 | Zeitlin . | |
| 3,610,886 | 10/1971 | Pansing | 219/364 |
| 3,767,894 | 10/1973 | Berger | 219/485 |
| 3,892,946 | 7/1975 | Rimmi | 219/364 |
| 3,979,576 | 9/1976 | Janson | 219/483 |
| 4,015,104 | 3/1977 | Eckman et al. . | |
| 4,138,609 | 2/1979 | Englemann . | |
| 4,851,646 | 7/1989 | Perala | 219/378 |

FOREIGN PATENT DOCUMENTS

| | | | |
|---|---|---|---|
| 1025540 | 3/1958 | Fed. Rep. of Germany | 219/483 |
| 66532 | 11/1984 | Finland . | |
| 424987 | 3/1935 | United Kingdom . | |
| 654898 | 7/1951 | United Kingdom . | |
| 2045016 | 10/1980 | United Kingdom . | |
| 2048028 | 12/1980 | United Kingdom . | |

Primary Examiner—Bruce A. Reynolds
Assistant Examiner—John A. Jeffery
Attorney, Agent, or Firm—Brumbaugh, Graves, Donohue & Raymond

[57] ABSTRACT

The invention relates to a method of controlling the supply of electric power to an electric sauna heater, the sauna heater being divided into two portions to be heated separately: a stone space (1) and an air duct (2) each being provided with one or more heating elements (1A1–1A3, 1B1–1B3, 2A1–2A3, 2B1–2B3) to heat the heat-storing material placed in the stone space (1) and the air contained in the sauna room, respectively. In the invention, to achieve good operating properties in this kind of sauna heater both with respect to the heating of the stone space and the air space of the sauna room without increasing the rated wattage of the sauna heater to an unreasonably high value, one or some of the heating elements are disconnected or connected to operate at partial power, whereby the power demand of the sauna heater is always smaller than the total power of the heating elements (1A1–1A3, 1B1–1B3, 2A1–2A3, 2B1–2B3).

10 Claims, 1 Drawing Sheet

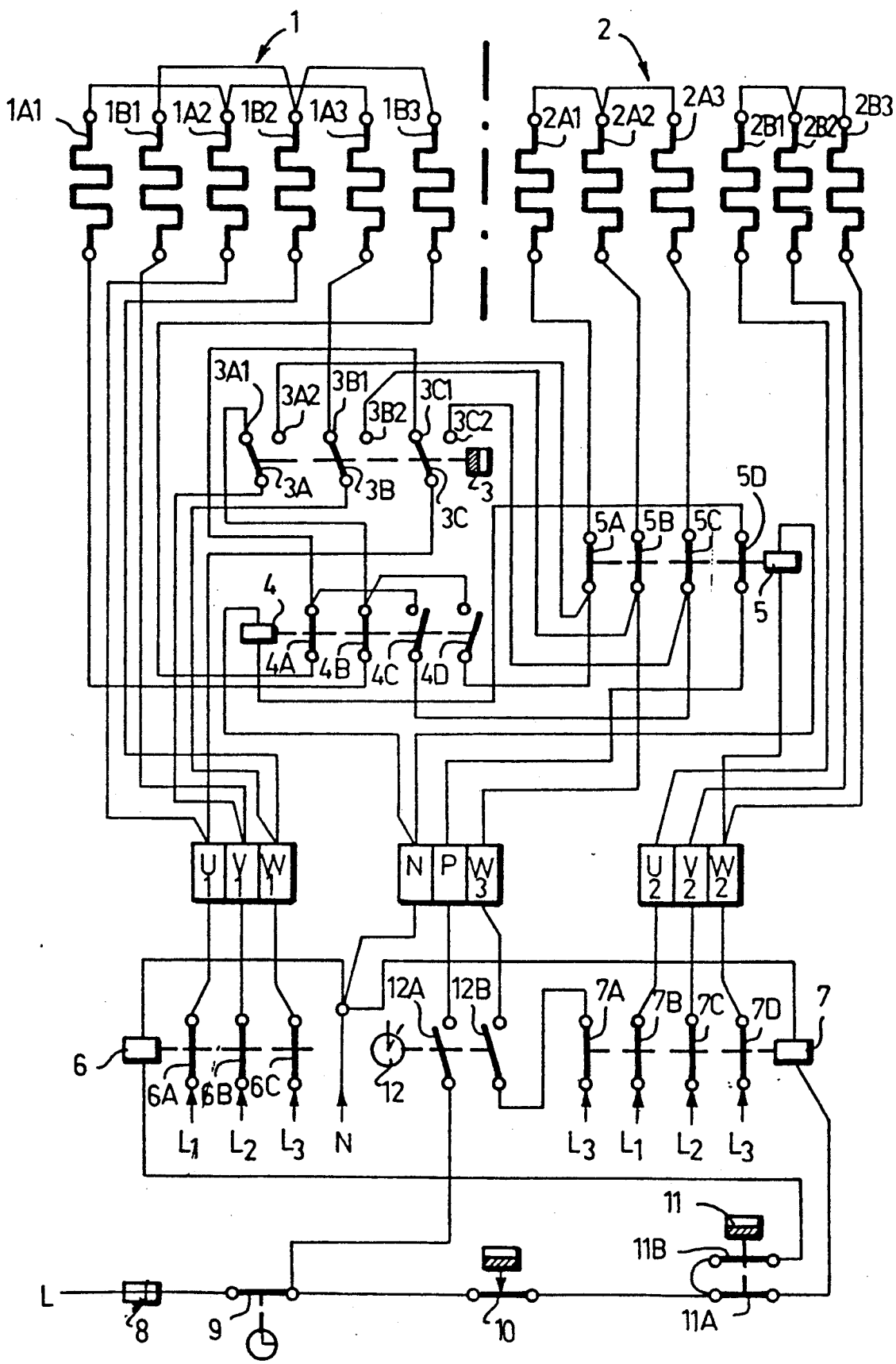

METHOD OF CONTROLLING THE SUPPLY OF ELECTRIC POWER TO AN ELECTRIC SAUNA HEATER

This invention relates to a method of controlling the supply of electric power to an electric sauna heater, the sauna heater being divided into two portions to be heated separately: a stone space and an air duct each being provided with one or more heating elements to heat the heat-storing material placed in the stone space and the air contained in the sauna room, respectively.

An electric sauna heater of the above type is known from FI Patent Specification 66 532, for instance. This sauna heater construction offers considerable advantages especially as far as institutional saunas are concerned, as is described in detail in the patent specification. As the temperature of the stone space in this kind of sauna heater can be kept constantly relatively high, the sauna heater has excellent steam generating properties even when the sauna has been without bathers for rather a long time, during which time relatively little energy is required for keeping the sauna warm. With a conventional sauna heater, this would involve a drop in the temperature of the sauna stones and deterioration in the steam generating properties. A problem with the sauna heater of the above-mentioned patent specification, however, is that it requires a relatively high rated wattage because the air duct and particularly the stone space has to be provided with heating elements of relatively high power to enable the heating of the large stone space into the desired temperature within a reasonable period of time. As a result, the total power demand of the sauna heater is too high for most smaller saunas built in apartment buildings and one-family houses, for instance. On the other hand, this construction would offer considerable advantages particularly in view of the steam generating properties especially in apartment buildings.

The object of the present invention is to provide a method of controlling an electric sauna heater of the type described above, which method avoids the problem associated with the high rated wattage of the sauna heater without substantially affecting the operating properties of the heater. This is achieved by means of a method according to the invention, which is characterized in that one or some of the heating elements are disconnected or connected to operate at partial power, whereby the power demand of the sauna heater is always smaller than the total power of the heating elements. This control enables the transfer of power between the different portions of the sauna heater, depending on the way of heating to be used and/or the bathing conditions without the need of high rated wattage. The properties of the sauna heater will not be substantially deteriorated by the transfer of power between the different portions of the heater. On the other hand, the lower rated wattage has many advantages. For instance, the fuse can be smaller with resultant lower tariff rates. It is also possible to use thinner supply lines to the heater. Accordingly, the electric sauna heater of the invention is also suitable for refitting purposes as the sauna heater can now be replaced with a new, more efficient one without having to renew the wiring.

Power can be disconnected wholly or partly from one of the heating elements or element groups in the sauna heater in various ways, and this is achieved by a single change-over switch which delivers power to the heating elements of the stone space or those of the air duct in a controlled manner. Partial power supplies, in turn, can be achieved either by changing the connections between the heating elements or by varying the current or voltage supplied to the heating elements in some other way, which is easy to effect by various transformer or semiconductor connections. One simple arrangement is characterized in that the heating elements of at least either the stone space or the air duct are divided into at least two separately controllable groups. The desired operation is to be achieved by suitable construction and position of the thermostats controlling these element groups.

In the following the method of the invention for the control of an electric sauna heater will be described in greater detail with reference to the attached drawing, in which the figure shows the circuit diagram of one specific embodiment of an electric sauna heater operating according to the invention by way of example.

In the connection shown in the figure, the sauna heater is divided into two portions to be heated separately: a stone space 1 and an air duct 2, each comprising six heating elements. The heating elements in the stone space are indicated 1A1, 1A2, 1A3, 1B1, 1B2, 1B3, and those in the air duct 2A1, 2A2, 2A3, 2B1, 2B2, 2B3. The heating elements of the stone space 1 are controlled by means of a thermostat 3 responsive to the temperature of the heat storing material placed in the stone space. Power supply to the heating elements of both the air duct and the stone space is additionally controlled by means of multipole relays 4, 5 or the like and contactors 6 and 7 with a three-phase supply L1, L2, L3. The control current of the contactors 6 and 7 is obtained from a control current circuit in which a thermostat 11 monitoring the temperature of the sauna room, a temperature limiter 10, a clock switch 9 and a fuse 8 are connected in series. The connection further comprises a switch 12 with two contacts for changing the mode of operation of the sauna heater. The operation of the above-mentioned relays, contactors, switches and thermostats will be described in more detail below.

In the figure, the sauna heater operates in the preheating mode, whereby the heat-storing material of the stone space 1 is heated first whereafter the heating of the air in the sauna room is started by means of the heating elements of the air duct 2. In the connection of the figure, full power is connected to all the heating elements 1A1 to 1A3 and 1B1 to 1B3 of the stone space 1 through contacts 3A, 3B and 3C in the thermostat 3 monitoring the temperature of the stone space when these contacts are engaged with their counter contacts 3A1, 3B1 and 3C1, respectively. To the contacts 3A, 3B and 3C power is supplied from contacts 6A, 6B and 6C in the contactor 6. The heating elements 2B1 to 2B3 of the air duct 2 also operate at full power, because the contacts 7B, 7C and 7D of the contactor 7 are closed. Instead, the heating elements 2A1 to 2A3 of the air duct 2 are disconnected even though the contacts 5A, 5B and 5C of the relay 5 are closed, because power is supplied to these contacts through the other contacts 3A2, 3B2, 3C2 of the thermostat monitoring the temperature of the stone space. In the situation shown in the figure, no power is supplied to the contacts 3A2, 3B2 and 3C2.

In the connection of the figure, all the heating elements of the stone space as well as half of the heating elements of the air duct are connected. Assuming that the power of each element is 1 kW, the power of the sauna heater is 9 kW, and the total power of the heating elements is 12 kW. The preheating mode can be used when a high steam generating capacity is to be obtained at the very beginning of the bathing.

The thermostat 3 starts to operate when the temperature of the heat-storing material of the stone space rises to a desired temperature. The thermostat 3 operates in two stages so that the contacts 3A and 3C first change their connection mode, being engaged with their counter contacts 3A2 and 3C2. The connection of the heating elements heating the stone space thereby changes so that one phase of their earlier three-phase star connections drops off, whereby the remaining heating elements are connected in series between the two phases of the supply voltage. The heating elements A1 and B3 are thereby disconnected and the heating elements 1A2 and 1A3 are connected in series as well as the heating elements 1B1 and 1B2. The power of each heating element in operation will thereby be $\frac{3}{4}$ of its rated power, that is, the total heating power of the stone space has dropped to one half of the original value. Assuming that the heating power of the stone space is 6 kW with all the heating elements in operation, it is now 3 kW. After the change-over switches 3A and 3C of the thermostat 3 are engaged with their counter contacts 3A2 and 3C2, the heating elements 2A2 and 2A3 of the air duct 2 are also supplied with a voltage, so that they are connected in series between two phases, whereby their power will be $\frac{3}{4}$ of their rated power, that is, assuming that the rated power of the resistors is 1 kW, the total power of the resistors 2A1 and 2A3 is now 1.5 kW, the total power of the air duct being 4.5 kW. In this way part of the heating power of the stone space is transferred to the heating of the air in the sauna room.

When the heat-storing material in the stone space further warms up, the other stage of the thermostat reacts, whereby also the contact 3B is engaged with its counter contact 3B2. Full power is thereby applied to all the heating resistors of the air duct 2. In the above specific case, the heating power of the air duct will be 6 kW. Correspondingly, the other heating element group of the stone space, that is, the heating elements 1A1 to 1A3 is completely disconnected and only the heating elements 1B1 and 1B2 are supplied with power, their total power being still 1.5 kW. Since the air space of the sauna room is now heated at maximal power, the desired temperature is achieved very rapidly, and the two-stage thermostat 11 starts to operate. The contact 11A of the thermostat 11 is disengaged first, whereby the relay 7 is energized as a result of which the heating elements 2B1 to 2B3 are disconnected. When the temperature rises further, the contact 11B of the thermostat 11 is also disengaged, whereby power supply to the sauna heater is totally interrupted.

In the above-described application of the sauna heater of the invention, the primary object is to keep the temperature of the heat-storing material of the stone space as high as possible and to adjust the temperature of the sauna room to a desired value by controlling the heating elements of the air duct. Alternatively, the switch 12 provided in the sauna heater of the invention enables the heat-storing material of the stone space to be heated only after the heating of the air of the sauna room. In this way, the sauna can be heated up very rapidly. It may be preferable to apply this alternative when a short sauna bath is to be taken, whereby the steam generating capacity of the sauna heater is not of any greater importance.

If the switch 12 is closed, the relay 4 changes the condition of its contacts so that the contacts 4A and 4B are disengaged and the contacts 4C and 4D are engaged. As a result, assuming that the thermostats 3 and 11 monitoring the temperature of the stone space and the air are in the connection mode corresponding to a cold sauna heater, that is, in the connection mode shown in the figure, full power is supplied to all the heating elements 2A1 to 2A3 and 2B1 to 2B3 of the air space 2, and the heating elements 1A2 and 1A3, and 1B1 and 1B2, respectively, of the stone space 1, are connected in series between two phases, whereby the total heating power of the stone space is 3 kW while the rated power of each heating element is 1 kW. So the air of the sauna room is heated with maximal power, and the heat-storing material of the stone space with one half of the maximum power only.

As a result of the heating of the air in the sauna room at maximum power, the contact 11A of the thermostat 11 is disengaged when the sauna room achieves its preset temperature, whereby all the heating elements of the air duct 2 are disconnected. However, the thermostat 3 monitoring the temperature of the stone space has not yet operated at all, so that full power is now connected to all the heating elements of the stone space. If the temperature of the sauna room keeps rising so that the contact 11B of the thermostat 11 is disengaged, all the heating elements of the sauna heater are disconnected. Alternatively, the temperature of the sauna room may drop so that the contact 11A of the thermostat 11 is also engaged, whereby full power is connected to the heating elements of the air duct 2 and the power supplied to the heating elements of the stone space drops by one half. Thus the temperature of the sauna heater rises until the thermostat 3 starts to operate.

In the latter mode of operation described above, in which the switch 12 is closed, the air in the sauna room can be heated very rapidly; on the other hand, after the achievement of the desired temperature in the sauna room, the stone space is also heated at full power.

As appears from the above, the sauna heater of the invention offers a great variety of different connection alternatives and the sauna room as well as the heat-storing material in the heater can be kept at a desired temperature irrespective of how long the heater possibly is unused. It is to be understood that it is possible to heat the air duct and the stone space relatively equally by means of connection arrangements corresponding to those shown in the figure, instead of giving priority to either one of them similarly as above. Even though this alternative mode of operation can be added to the sauna heater of the invention, this alternative, however, does not, unlike the connection alternatives described above, provide the major advantages over the prior art. The most important advantage of the method of the invention for controlling the power supply to a sauna heater is that the heating power can be transferred to the heating of the heat-storing material of the sauna heater or the air in the sauna room, without increasing the total power demand of the device. For this reason, the sauna heater can be heated rapidly and nevertheless possess excellent steam generating properties.

The method of the invention for controlling the supply of power to an electric sauna heater has been described above by way of example by means of one specific circuit diagram, and it is to be understood that the idea of the invention, that is, the control of the supply of power to the heating elements in the different portions of the sauna heater, the stagewise operation or the grouping of the heating elements into separately controllable groups, can be applied to sauna heaters with some other kind of circuit diagram without deviating from the scope defined in the attached claims.

We claim:

1. A method of controlling the supply of electric power to an electric sauna heater divided into a stone space containing a heat-storing material and an air duct through which sauna room air is adapted to flow to be separately heated each to a suitable temperature without exceeding a predetermined total power demand, comprising the steps of:

providing in each of the stone space and the air duct one or more groups of one or more heating elements each which, if all are connected to a source of electric power, separately heat the heat-storing material contained in the stone supply and sauna room air flowing in the air duct, respectively, to temperatures suitable for sauna bathing, and which together have a rated wattage which exceeds said predetermined power demand;

connecting all of said heating elements to a source of electric power capable of delivering only said predetermined total power demand; and selectively disconnecting from said source of power at least one heating element of one or more of said groups so that the overall power demand of the heater is always less than the total rated wattage of all of said heating elements.

2. A method according to claim 1, wherein the heating elements of the stone space are divided into at least two separately controllable element groups.

3. A method according to claim 1, wherein the heating elements of the air duct are divided into at least two separately controllable element groups.

4. A method according to claim 1, wherein the heating elements of the stone space and the air duct are divided into at least two separately controllable elements groups.

5. A method according to claim 1, comprising the further step of selecting said at least one heating element to be disconnected when initiating the heating.

6. A method of controlling the supply of electric power to an electric sauna heater divided into a stone space containing a heat-storing material and an air duct through which sauna room air is adapted to flow to be separately heated each to a suitable temperature without exceeding a predetermined total power demand, comprising the steps of:

providing in each of the stone space and the air duct one or more groups of one or more heating elements each which, if all are connected to a source of electric power, separately heat the heat-storing material contained in the stone supply and sauna room air flowing in the air duct, respectively, to temperatures suitable for sauna bathing, and which together have a rated wattage which exceeds said predetermined power demand; and connecting all of said heating elements to a source of power capable of delivering only said predetermined power and selectively operating at least one heating element of one or more of said groups at less that its rated wattage so that the overall power demand of the heater is always less than the total rated wattage of all of said heating elements. the heating elements to operate at partial power, so that the power demand, of the sauna heater is always smaller than the total power of the heating elements.

7. A method according to claim 6, wherein the heating elements of the stone space are divided into at least two separately controllable element groups.

8. A method according to claim 6, wherein the heating elements of the air duct are divided into at least two separately controllable element groups.

9. A method according to claim 6, wherein the heating elements of the stone space and the air duct are divided into at least two separately controllable element groups.

10. A method according to claim 6, comprising the further step of selecting said at least one heating element to operate at less than its rated wattage when initiating the heating.

* * * * *

UNITED STATES PATENT AND TRADEMARK OFFICE
CERTIFICATE OF CORRECTION

PATENT NO. : 5,021,637

DATED : June 4, 1991

INVENTOR(S) : Perälä et al.

It is certified that error appears in the above-identified patent and that said Letters Patent is hereby corrected as shown below:

Column 5, lines 44-45, "elements" should read --element--;

Column 6, line 24, "less that" should read --less than--;

Column 6, lines 26-30, delete "the heating elements to operate at partial power, so that the power demand, of the sauna heater is always smaller than the total power of the heating elements.".

Signed and Sealed this

Twenty-ninth Day of December, 1992

Attest:

DOUGLAS B. COMER

Attesting Officer

Acting Commissioner of Patents and Trademarks